United States Patent [19]

Basey

[11] 4,344,604

[45] Aug. 17, 1982

[54] VARIABLE RAKE STAIR RAIL ASSEMBLY

[75] Inventor: Gene Basey, Rowland Heights, Calif.

[73] Assignee: Zenith Stairways & Building Products, Inc., Walnut, Calif.

[21] Appl. No.: 201,259

[22] Filed: Oct. 27, 1980

[51] Int. Cl.³ ............................................. E04H 17/14
[52] U.S. Cl. ....................................... 256/65; 256/67; 256/22; 248/222.4; 403/254
[58] Field of Search ........................ 256/59, 65, 66, 67, 256/21, 22, 19; 403/254; 248/222.4

[56] References Cited

U.S. PATENT DOCUMENTS

| | | | |
|---|---|---|---|
| 2,754,092 | 7/1956 | Cremens | 256/65 X |
| 2,855,227 | 10/1958 | Bottom | 256/21 X |
| 3,156,282 | 11/1964 | Bedford, Jr. | 403/254 X |
| 3,596,880 | 8/1971 | Greenberg | 256/59 X |
| 3,858,850 | 1/1975 | Maxcy et al. | 256/22 |

FOREIGN PATENT DOCUMENTS

| | | | |
|---|---|---|---|
| 655986 | 1/1938 | Fed. Rep. of Germany | 248/222.4 |
| 545043 | 7/1922 | France | 256/65 |

Primary Examiner—James Kee Chi
Attorney, Agent, or Firm—Poms, Smith, Lande & Rose

[57] ABSTRACT

A variable rake stair rail assembly which includes a hand rail, a shoe rail, and a plurality of elongated balusters extending intermediate the shoe rail and the hand rail. Means are provided for joining each of the balusters to the hand rail and the shoe rail. The hand rail and shoe rail may be channel shaped. The means comprises an elongated member extending into at least one end of each baluster and having a generally enlarged axial extremity disposed in spaced relationship to the baluster which cooperates with a strip shaped member fixed to at least one of the rails. The strip shaped member has an opening disposed therein for accepting the enlarged axial extremity of the elongated member, without removal from the end of the baluster. In a preferred embodiment, each of the strip shaped members may include a tongue shaped portion defining one side of each of the openings. Each of the tongues may be elongated and have a width at a first axial portion which is smaller than at a second axial portion. The first axial portion ordinarily is proximate to the opening. The tongue may be movable between a second position in which the enlarged axial extremity is movable in and out of the opening and a first position constraining movement of the enlarged axial extremity. Each of the tongues may have an arcuate axial extremity defining one side of the opening.

29 Claims, 9 Drawing Figures

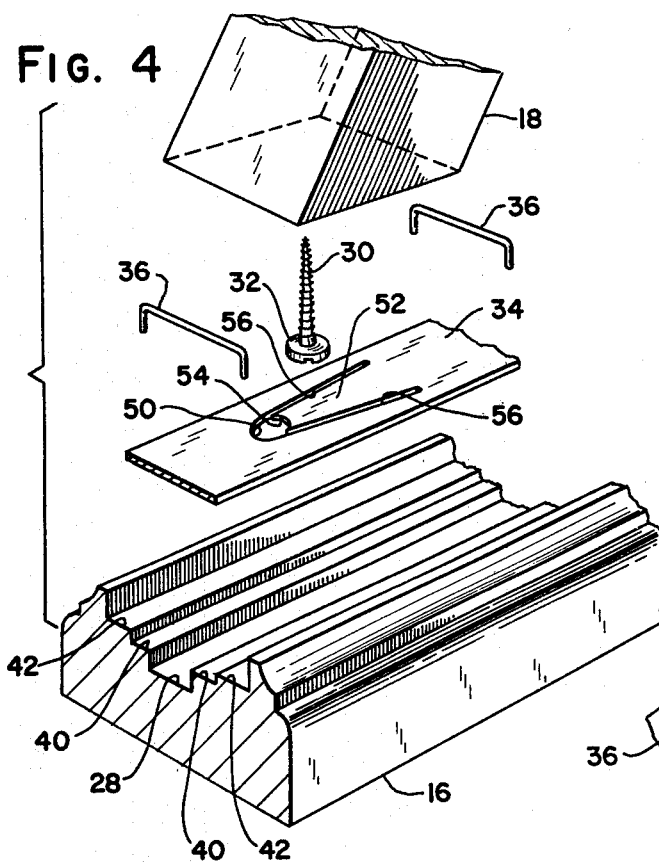
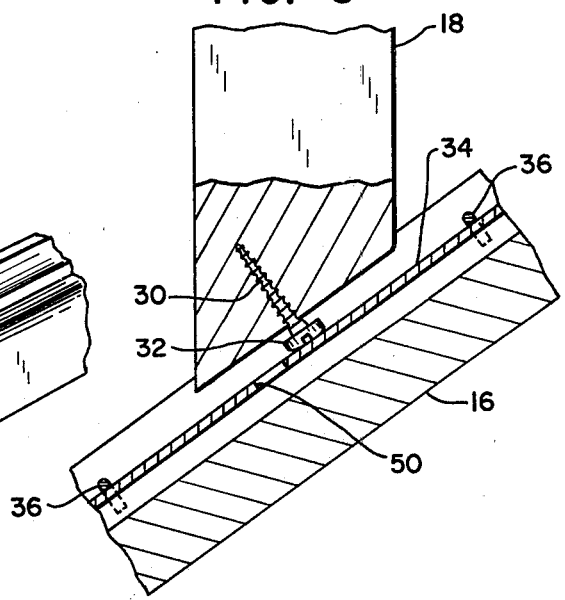
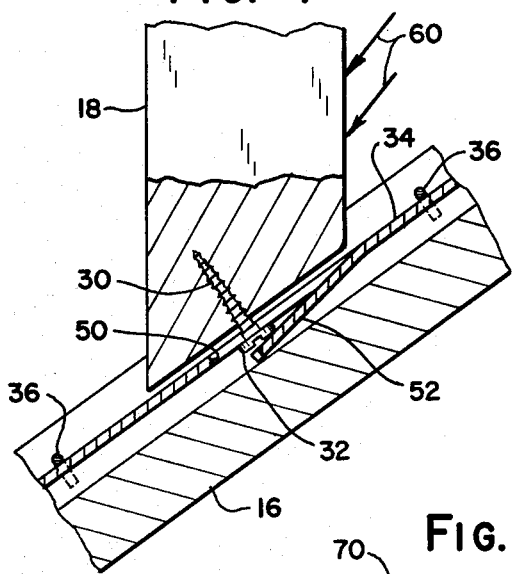
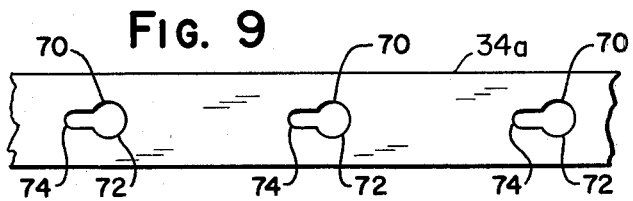

VARIABLE RAKE STAIR RAIL ASSEMBLY

BACKGROUND OF THE INVENTION

The invention relates to building construction and specifically to stair rail assemblies. The present application relates to apparatus which has some general similarity to apparatus in the applicant's earlier application Ser. No. 157,186, which was filed in the U.S. Patent and Trademark Office on June 6, 1980.

Stair rail assemblies typically include a hand rail and a shoe rail which are disposed in generally parallel relationship. A plurality of generally vertical balusters extend intermediate the hand rail and the shoe rail. A generally vertical post at the lower extremity of the assembly is referred to as a starting newel.

The prior art includes preassembled variable rake stair rail assemblies which use balusters that extend into channel shaped hand and shoe rails. In one form the prior art utilizes a plurality of pins which extend through the opposed sides of the channels of the hand rail and the shoe rail. Each pin engages an axial extremity of a baluster. Such constructions have not been wholly satisfactory because the manner of construction of such assemblies is of primary interest for factory assembly of the entire apparatus and subsequent fully assembled shipment. Shipment of fully assembled structures is inconvenient for the manufacturer, the building supply dealer and the contractor. Shipment to so called "Do-it-yourselfers" of such fully assembled apparatus may be impossible since such individuals will typically not have ready access to a truck or similar transport vehicle. Another disadvantage of such prior art structures is that the pins on which the balusters are pivoted are, at least in some cases, unsightly in appearance. It will thus be seen that the prior art structures which do allow variation in the angle between the baluster and respectively the hand rail and shoe rail have several specific disadvantages in addition to being generally complex and expensive to manufacture.

The structure described in the applicant's co-pending application overcomes many of the problems inherent in the prior art structures which did not allow variation in the angle between each baluster and the hand and shoe rails and in addition avoided the complexity and expense which was inherent in the earlier structures.

It is a primary object of the invention to provide apparatus which will allow flexibility in orientation of the balusters with respect to the shoe and hand rails and will at the same time allow shipment in a compact form.

It is another object of the invention to provide apparatus which will be able to withstand substantial loads without resultant damage as in some prior art apparatus.

It is another object of the invention to provide apparatus which may be even more easily assembled at the individual construction site than even the apparatus described in the co-pending application of the present application.

Another object of the invention is to provide apparatus which will minimize total construction costs by reducing the total cost of installing a stair rail assembly including the cost for material and labor to install the apparatus, specifically the labor required in the steps of providing the proper orientation of the shoe rail and hand rail with respect to the steps of a stairway.

Still another object of the invention is to provide apparatus which makes it easy for the user to vary the angle between both the shoe and hand rail with respect to the baluster, that is, to rack the assembly.

Yet another object of the invention is to provide apparatus which is inexpensive to manufacture.

SUMMARY OF THE INVENTION

The foregoing objects and other objects and advantages which shall become apparent from the detailed description of the preferred embodiment are attained in a variable rake stair rail assembly which includes a channel shaped hand rail, a channel shaped shoe rail, and a plurality of elongated balusters extending intermediate the channel in the shoe rail and the channel in the hand rail. Means are provided for joining each of the balusters to the hand rail and the shoe rail. The means for joining may include an elongated member extending into at least one end of each baluster and having a generally enlarged axial extremity disposed in spaced relationship to the baluster which cooperates with a strip shaped member fixed to at least one of the rails, the strip shaped member having an opening disposed therein for accepting the enlarged axial extremity of the elongated member, the opening allowing movement of the enlarged axial extremity in and out thereof in at least one relative position of the opening and the enlarged axial extremity.

Each of the balusters may be joined at each axial extremity in substantially the same manner. Each of the strip shaped members may include a tongue shaped portion defining one side of each of the openings. Each of the tongues is elongated and has a width at a first axial portion which is smaller than at a second axial portion. The first axial portion may be proximate to the opening. The sides of the tongue may have converging, diverging or parallel sides. Alternatively, the sides may have axial sections which are converging and then diverging. Each of the tongues may have an arcuate axial extremity defining one side of the opening. The apparatus may further include a fillet extending intermediate successive balusters which cooperates with each rail and extends over the strip shaped member.

The rails may each have a channel having a step shaped cross section, the channel including first and second opposed sides which are disposed in generally parallel relationship and engage the sides of each of the balusters. The channels may further include an elongated recess which has an axis which is disposed in generally parallel relationship to the first and second opposed sides. At least one staple may cooperate with the strip shaped member and also may engage one of the channel shaped rails, the engagement between the staple and the channel shaped rail being intermediate first and second balusters which engage the channel shaped member. In alternate embodiments the strip shaped member may be fastened with screws or adhesive. The strip shaped member may be metallic and may be spring steel. The strip shaped member may be plastic. The members having a generally enlarged axial extremity may be wood screws. The step shaped cross section may include a recess for accommodating the fillet.

BRIEF DESCRIPTION OF THE ACCOMPANYING DRAWING

FIG. 4 is a broken away exploded view of a portion of the apparatus illustrated in FIG. 1;

Figure 1:
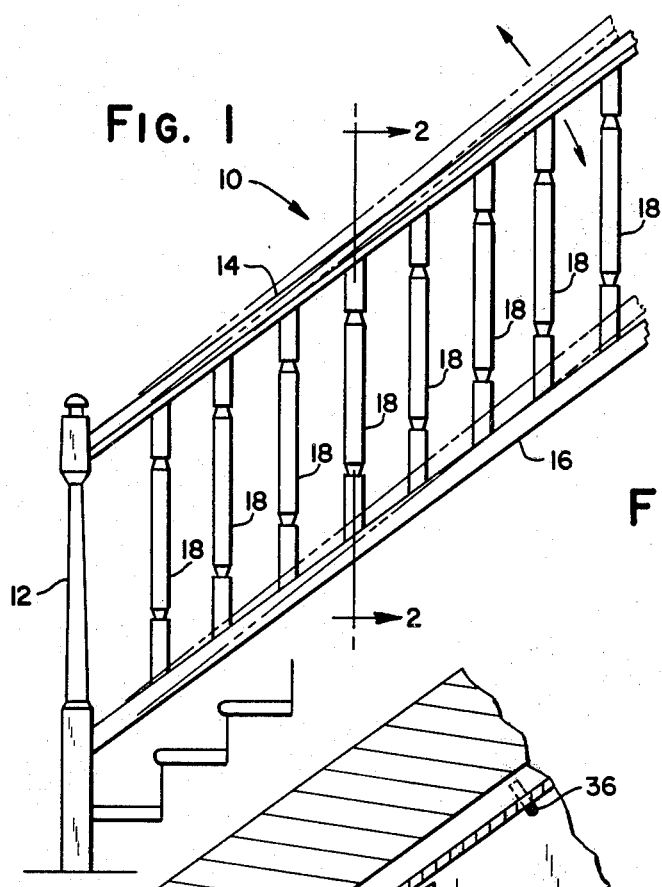
FIG. 1 is a side view of a stair rail assembly in accordance with a first embodiment of the invention.
Figure 2:
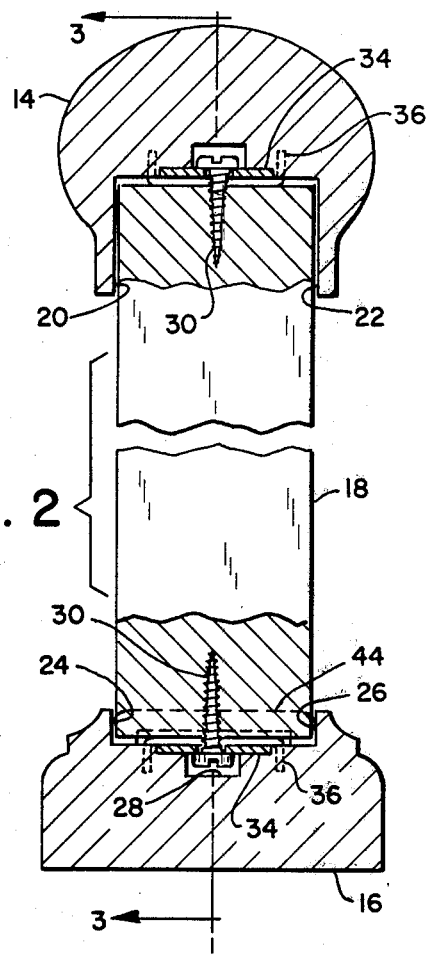
FIG. 2 is a broken away sectional view taken along the lines 2—2 of FIG. 1.

FIGS. 6, 7, and 8 are fragmentary sectional views illustrating the sequential steps involved in engaging a baluster with the lower channel member; and FIG. 9 is a broken away plan view of an alternative embodiment in which the strip shaped member is provided with a plurality of elongated mutually spaced holes.

DESCRIPTION OF THE PREFERRED EMBODIMENT

Referring now to FIGS. 1-5 there is shown a variable rack stair rail assembly 10 which includes a starting newel 12, a hand rail 14, and a shoe rail 16. A plurality of balusters 18 are disposed in generally parallel relationship and extend intermediate the shoe rail 16 and the hand rail 14. The hand rail 14 includes generally parallel, generally planar opposed sides 20, 22, which define a channel. The sides 20, 22 engage the sides of the upper axial extremity of each baluster 18. In a similar manner generally planar, generally parallel opposed sides 24, 26 of the shoe rail 16 engage the sides of the lower axial extremity of each baluster 18. In one form of the invention the channel defined by the sides 24, 26 further includes an elongated recess 28 which has the axis thereof disposed in generally parallel relationship to the sides 24, 26.

Figure 3:
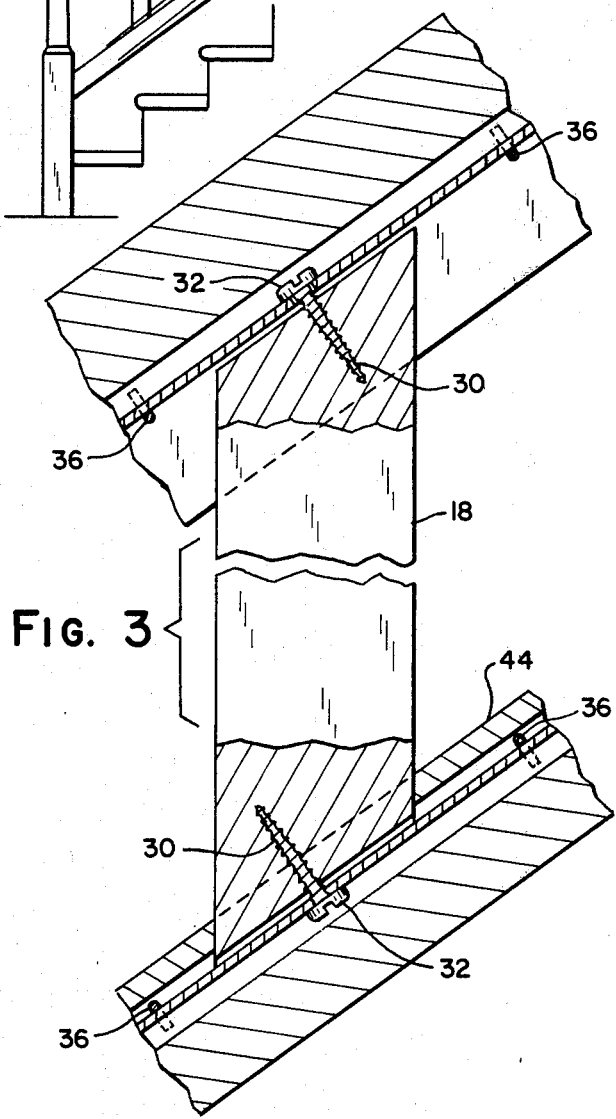
FIG. 3 is a broken away sectional view taken along the line 3—3 of FIG. 2.
Figure 5:
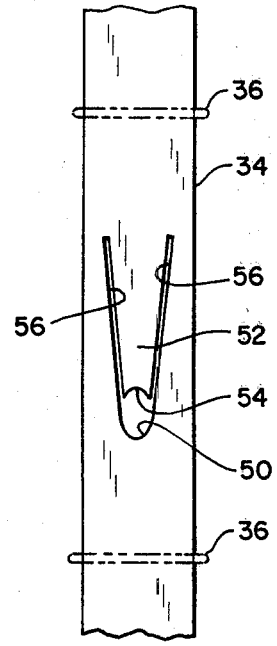
FIG. 5 is a top view of the spring steel band and cooperating staples illustrated in FIGS. 2 and 3.

Each baluster 18 is secured to the shoe rail 16 by means of a wood screw 30 which extends generally axially within the baluster 18 with which it cooperates. It will be understood that a variable rake rail assembly refers to an assembly which permits relative angular movement between each baluster 18 and the cooperating rails to provide flexibility during installation. This flexibility is necessary because the relative sizes of the riser and step portions of the stairway in different buildings and even in the same building may vary and thus require the adjustment of the stair rail assembly or more particularly a variable rake stair rail assembly. Ordinarily each screw head 32 of the screws 30 will be positioned in spaced relationship from the axial extremity of the baluster 18 with which is cooperates. Each rail ordinarily will include a spring steel band 34 which, in the preferred form, is joined to the rail on which it is carried by a plurality of staples 36. As best seen in FIG. 4, the shoe rail 16 is provided with a generally step shaped cross section which includes an elongated recess 28 for accommodating the heads 32 of the screws 30, surfaces 40 for accommodating the spring steel band 34, and surfaces 42 for accommodating alternately a baluster 18 and a fillet 44. The fillet 44 is provided to cover the top of the spring steel band 34 and the staples 36 as best seen in FIG. 3.

The spring steel band 34 is provided with a plurality of openings 50 (one shown) disposed at intervals corresponding to the intervals between balusters 18. Each opening 50 is defined, in part, by a generally planar tongue or plate 52 having an arcuate free end 54. In a preferred form the sides of the tongue or plate 52 are disposed in coplanar relationship. Ordinarily the openings 50 and the slots 56 will be stamped from spring steel stock in a continuous manufacturing operation.

The assembly of the balusters 18 to the shoe rail 16 corresponds generally to the assembly of the baluster 18 to the hand rail 14. The assembly of the former is best illustrated in FIGS. 6, 7, and 8. The baluster 18 with the depending wood screw 30 is positioned proximate to spring steel band 34 and particularly to the opening 50 therein. As best shown in FIG. 7, a force in the direction of arrow 60 is applied to the baluster 18, forcing the tongue 52 downward and allowing easy entrance of the head 32 of the screw 30 into the opening 50. Thereafter the tongue 52 will move to the position shown in FIG. 8 wherein the assembly will not be easily separated. More specifically in the assembled condition, illustrated in FIG. 8, the baluster 18 may be rocked either to the left or to the right to facilitate installation. It will be apparent that this rocking motion will not cause separation of the head 32 and the opening 50.

Returning now to FIG. 9, there is shown another embodiment of the invention in which a spring steel band or strip shaped member 34a is provided with a plurality of mutually spaced elongated holes 70 which each have a first axial portion 72 which allows entrance and exit of the enlarged axial extremity or head 32 and a second axial portion 74 which does not allow passage of the enlarged axial extremity or head 32. In this embodiment, each head 32 is inserted into the first axial portion 72 and then moved axially along the strip shaped member 34a so that the head 32 will not pass through the second axial portion 74. Once so positioned the baluster 18, which is engaged by the screw 30, will be firmly locked in place by the fillet 44. The general appearance of this assembled embodiment will be similar to FIGS. 2 and 3.

Alternative constructions include the use of any elongated member similar to a wood screw having a head which is larger than a portion which extends into the baluster 18 with which it cooperates. The baluster 18 may be constructed of various materials such as wood, plastic, or metal. For convenience a wood screw has been referred to herein since it is preferred construction and is convenient for use with the common wooden baluster. With metal balusters it will be understood, for example, that rivets and other similar fasteners may be used. The tongue may have an axial portion in which the sides diverge, converge or are parallel in various embodiments of the invention. For example, the "free end" of the tongue may have converging sides and the remainder of the tongue may converge.

Similarly, the member 34 has been referred to herein as a spring steel band. It will be understood that although such a material is particularly desirable, other metallic and even plastic materials may be utilized without departing from the spirit of the invention. In various forms of the invention the balusters and rails may be manufactured of wood, plastic or metal.

It will be understood that the assembly may be easily accomplished and that the resulting assembly will satisfy the required rigidity requirements, as well as allowing for very rapid assembly after being shipped in a so-called "knocked down" condition. It will be further understood that the substantial reduction in assembly time will substantially reduce the costs of assembly over various other prior art apparatus. The continuous manufacture of the spring steel band 34 will also facilitate inexpensive fabrication.

The invention has been described with reference to its illustrated preferred embodiment. Persons skilled in the art of constructing stair rail rack assemblies may, upon exposure to the teachings herein, conceive variations in the mechanical development of the components therein. Such variations are deemed to be encompassed by the disclosure, the invention being delimited only by the appended claims.

The inventor claims:

1. A variable rake stair rail assembly which comprises:

a wooden hand rail having an elongated recess;

a wooden shoe rail having an elongated recess;

a plurality of elongated balusters extending in spaced relation intermediate the shoe rail and the hand rail;

means for joining each of said balusters to said hand rail and said shoe rail, said means for joining comprising an elongated member extending into at least one end of each baluster and having a generally enlarged axial extremity disposed in spaced relationship thereto and a flat elongated strip shaped member secured to each of said rails at the bottom of each said recess; said strip shaped member having an opening therein for receiving and accepting said enlarged axial extremity of said elongated member, without removing said elongated member from the end of the baluster, said opening allowing movement of said enlarged axial extremity in and out thereof in at least one relative position of said opening and said enlarged axial extremity; and means for locking the ends of said balusters in the desired assembled position relative to said hand and shoe rails.

2. The apparatus as described in claim 1, wherein: each baluster is joined at each axial extremity in substantially the same manner.

3. The apparatus as described in claim 2, wherein: each of said strip shaped members includes a tongue shaped portion defining one side of each of said openings.

4. The apparatus as described in claim 3, wherein: each of said tongues is elongated and has a width at a first axial portion which is smaller than at a second axial portion.

5. The apparatus as described in claim 4, wherein: said first axial portion is proximate to said opening.

6. The apparatus as described in claim 5, wherein: the sides of said tongue for at least an axial portion thereof converge.

7. The apparatus as described in claim 6, wherein: each of said tongues has an arcuate axial extremity defining one side of said opening.

8. The apparatus as described in claim 7, further including:

a fillet extending intermediate successive balusters cooperating with each rail and extending over said strip shaped member.

9. The apparatus as described in claim 8, wherein: said channel shaped rails each have a channel having a step shaped cross section, said channel including first and second opposed sides which are disposed in generally parallel relationship engaging the sides of each of said balusters, said channels further including an elongated recess which has an axis which is disposed in generally parallel relationship to said first and second opposed sides.

10. The apparatus as described in claim 9, further including:

at least one staple cooperating with said strip shaped member and also engaging one of said channel shaped rails, said engagement between said staple and said channel shaped rail being intermediate successive balusters engaging said channel shaped member.

11. The apparatus as described in claim 10, wherein: said strip shaped member is metallic.

12. The apparatus as described in claim 11, wherein: said strip shaped member is spring steel.

13. The apparatus as described in claim 10, wherein: said strip shaped member is plastic.

14. The apparatus as described in claim 12, wherein: said members having a generally enlarged axial extremity are wood screws.

15. The apparatus as described in claim 14, wherein: said step shaped cross section includes recesses for accommodating said fillet.

16. A variable rake stair rail assembly which comprises:

a channel shaped wooden hand rail;

a channel shaped wooden shoe rail;

a plurality of elongated balusters extending intermediate the channel in said shoe rail and the channel in said hand rail;

means for joining each of said balusters to said hand rail and said shoe rail, said means for joining comprising (1) an elongated member extending into at least one end of each baluster and having a generally enlarged axial extremity disposed in spaced relationship thereto and (2) a flat, elongated strip shaped member secured to at least one of said rails at the bottom of the channel therein, said strip shaped member having an opening disposed therein for accepting said enlarged axial extremity of said elongated member, said opening being elongated and having a first axial portion which is dimensioned to allow entrance and exit of said enlarged axial extremity and a second axial extremity which will not allow entrance or exit of said enlarged axial extremity as the result of axial movement of said elongated member;

said assembly including means for securing said strip shaped member to the bottom of the channel in one of said rails at points located approximately half way between successive balusters, whereby said strip shaped members may flex between the balusters and the securing points to permit racking of the assembly to change the rake thereof; and means for locking said balusters in place secured at the desired location relative to said rails.

17. The apparatus as described in claim 16, wherein: each baluster is joined at each axial extremity in substantially the same manner.

18. The apparatus as described in claim 17, further including:

wooden fillet means extending between and engaging successive balusters, secured to each rail and extending over and concealing said strip shaped member.

19. The apparatus as described in claim 18, wherein: said channel shaped rails each have a channel having a step shaped cross section, said channel including first and second opposed sides which are disposed in generally parallel relationship engaging the sides of each of said balusters, said channels further including an elongated recess which has an axis which is disposed in generally parallel relationship to said first and second opposed sides.

20. The apparatus as described in claim 19, further including:

at least one staple cooperating with said strip shaped member and also engaging one of said channel shaped rails, said engagement between said staple and said channel shaped rail being intermediate successive balusters engaging said channel shaped member.

21. The apparatus as described in claim 20, wherein: said strip shaped member is metallic.

22. The apparatus as described in claim 21, wherein: said strip shaped member is spring steel.

23. The apparatus as described in claim 20, wherein: said strip shaped member is plastic.

24. The apparatus as described in claim 22, wherein: said members having a generally enlarged axial extremity are wood screws.

25. The apparatus as described in claim 24, wherein: said step shaped cross section includes recesses for accommodating said fillet.

26. A variable rake stair rail assembly which comprises:
a channel shaped hand rail;
a channel shaped shoe rail;
a plurality of elongated balusters extending intermediate the channel in said shoe rail and the channel in said hand rail; means for joining each of said balusters to said hand rail and said shoe rail, said means for joining comprising (1) an elongated member extending into at least one end of each baluster and having a generally enlarged axial extremity disposed in spaced relationship thereto and (2) a flat elongated strip shaped member fixed to the bottom of the channels of said rails, said strip shaped member having an opening disposed therein for accepting said enlarged axial extremity of said elongated member;
means for engaging and disengaging said elongated member from said strip shaped member without separating said elongated members from the baluster into which each extends;
means for locking said baluster ends to said rails; and
fillet means mounted in said channels and extending between adjacent balusters for concealing said strip shaped members and the ends of said balusters.

27. A variable rake stair rail assembly having a predetermined normal stairway pitch and susceptible of being racked by a small acute angle to a steeper or less steep pitch, comprising:
a wooden hand rail,
a wooden shoe rail,
a plurality of elongated wooden balusters extending vertically between said hand rail and said shoe rail, the ends of each of said balusters being cut at an angle to the axis of the baluster substantially conforming to said normal stairway pitch;
means defining longitudinally extending recesses in said hand rail and said shoe rail enclosing the ends of said balusters with the bottom of said recesses extending substantially parallel to said ends of said balusters;
means for mounting said balusters onto said hand rail and said shoe rail with the ends of said balusters close to but spaced from the opposed surface areas at the bottom of said recesses, said mounting means including high strength deformable mechanical means secured to both the ends of said baluster and to said rails, said mechanical means holding said assembly at each joint thereof to provide the normal pitch for a stairway with the balusters vertical, said spacing between said ends of said balusters and said recessed surface areas in said rails being substantially that required to permit racking of said stair rail assembly to increase or reduce the pitch of said stair rail assembly by said small acute angle by the flexing of said deformable mechanical means; and
wood fillet means for securing in said recesses between the adjacent ends of adjacent balusters in said shoe rail to conceal the space between the ends of said balusters and said shoe rail and to more firmly secure said stair rail assembly at the desired pitch angle for each installation.

28. A variable rake stair rail assembly as defined in claim 27 wherein said baluster mounting means includes at least one spring strip extending along one of said rails in a longitudinal recess, and wood screw means extending into the ends of said balusters, and into said rails for securing said spring strip to said rails and said balusters.

29. A variable rake stair rail assembly having a predetermined normal stairway pitch and susceptible of being racked by a small acute angle to a steeper or less steep pitch, comprising:
a wooden hand rail,
a wooden shoe rail,
a plurality of elongated wooden balusters extending vertically between said hand rail and said shoe rail, the ends of each of said balusters being cut at an angle to the axis of the baluster substantially conforming to said normal stairway pitch;
wood screws secured in each end of each said baluster with the head of each said screw being spaced from the end of each said baluster;
means defining longitudinally extending recesses in said hand rail and said shoe rail enclosing the ends of said balusters, with the bottom of said recesses extending substantially parallel to said ends of said balusters;
means for mounting said balusters onto said hand rail and said shoe rail with the ends of said balusters close to but spaced from the opposed surface areas at the bottom of said recesses, said mounting means including spring strip means secured to the bottom of each said longitudinally extending recess, said spring strip means being provided with opening means for permitting entry of the head of said screws secured to the end of said balusters without unscrewing said screws; and
means for locking said screws into position in said strip means with the stair assembly at the desired angle for each installation.

* * * * *